Sept. 9, 1969  HISAO YAMAMOTO ET AL  3,466,152
SYNTHETIZING REACTOR EQUIPPED WITH TEMPERATURE
CONTROL DEVICE FOR CATALYST LAYER
Filed March 22, 1966
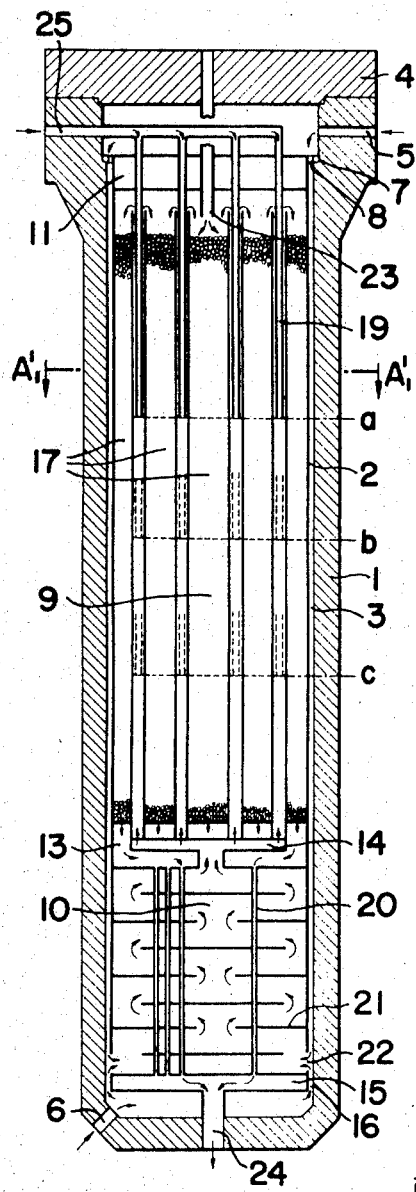
FIG. I
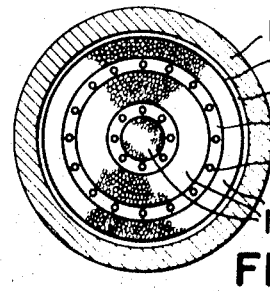
FIG. 2
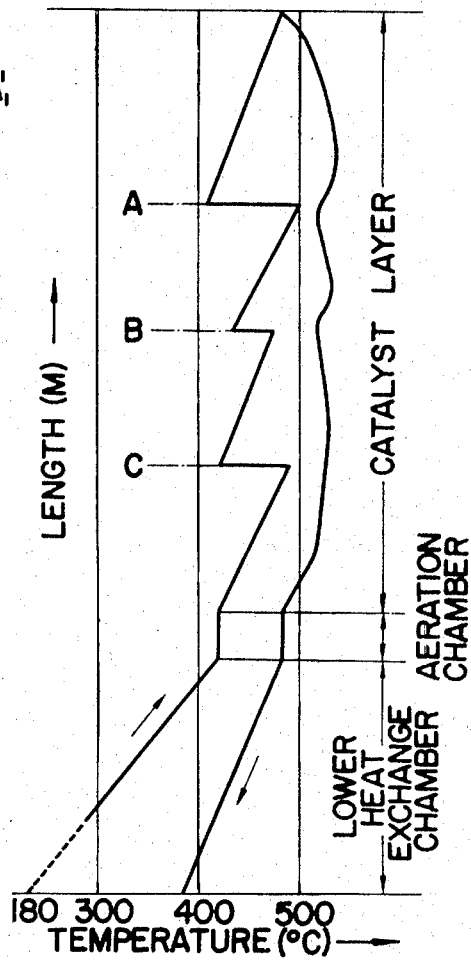
FIG. 3
INVENTORS
HISAO YAMAMOTO
NOBORU IWAASA
BY
Buckman and Archer
THEIR ATTORNEYS United States Patent Office 3,466,152
Patented Sept. 9, 1969

3,466,152
SYNTHETIZING REACTOR EQUIPPED WITH TEMPERATURE CONTROL DEVICE FOR CATALYST LAYER
Hisao Yamamoto and Noboru Iwaasa, Yamaguchi-ken, assignors to Ube Industries, Ltd., Yamaguchi-ken, Japan, a corporation of Japan
Filed Mar. 22, 1966, Ser. No. 536,417
Claims priority, application Japan, July 28, 1965, 40/45,365
Int. Cl. B01j 9/00
U.S. Cl. 23—289                    6 Claims

ABSTRACT OF THE DISCLOSURE

A reactor for effecting a catalyzed gaseous reaction which comprises a reaction chamber and a heat exchanger. The reaction chamber has a plurality of spaced catalyst chambers each having an inlet for introduction of unreacted gas and an outlet for discharge of reacted gas. The heat exchanger has means defining a first gas flow path in communication with the outlets and a means defining a second gas flow path. The first gas flow path being separate from, but in thermal contact with the second gas flow path. The space between the catalyst chambers being such as to afford a passage for unreacted gas from the second gas flow paths to the inlets of the catalyst chambers. Such space having a plurality of pipes disposed therein and each pipe having an outlet in communication with said space so that in operation further unreacted gas can be passed into the space by means of said pipes and admixed with the unreacted gas in such space.

---

This invention relates to a temperature control device for the catalyst layer in an apparatus for effecting exothermic synthetizing reaction by the use of a catalyst at high temperature and under high pressure, for example in the synthesis of ammonia or methanol.

Synthetizing reactors of this type have hitherto been classified by the method of removing the heat of reaction produced, into two types; the reactors of external heat exchange type and self heat exchange type.

The reactors of external heat exchange type are complicated in construction because a heating medium not directly related to the reaction has to be passed through the reactor. They are also disadvantageous because the temperature of catalyst layer rises rapidly before the cooling means and drops again rapidly after the cooling means.

On the other hand, the reactors of self heat exchange type present a problem in the temperature control of the catalyst layer since isothermal operation of the catalyst layer must be performed effectively.

To cite the reaction for ammonia synthesis as an example, the reaction velocity drops gradually with an increase in the ammonia concentration, and hence the quantity of heat produced per unit amount of the catalyst is decreased. In other words, a large quantity of heat is produced and the temperature rises sharply in the vicinity of the inlet of the catalyst layer. Conversely, in the vicinity of the outlet, the heat development is limited and the temperature rises slowly.

From the foregoing it is obvious that, in order to effect the isothermal reaction, the heat transfer (cooling) effect of the catalyst layer must be enhanced in the vicinity of the inlet of the catalyst layer and the effect in the vicinity of the outlet must be inhibited.

To accomplish this, two methods are employed. One method consists of passing unreacted gas for cooling in the form of parallel flow with the flow of reacted gas, and the other consists of passing the unreacted gas in the form of a counter-current. In the case of a parallel flow, there is a tendency that the temperature in the vicinity of the outlet of the catalyst layer increases. Considering the reaction velocity and equilibrium concentration, it is clearly beneficial that the temperature at the point where the ammonia concentration is high should be kept as low as possible. In the case of counter-current, the temperature in the vicinity of the catalyst layer tends to rise rapidly until the catalyst is deteriorated or otherwise affected in quality. On the contrary, in the vicinity of the outlet of the catalyst layer, the temperature may become so low that the reaction temperature can no longer be maintained.

The present invention is directed to an invention which overcome the foregoing difficulties and to one which attain sufficient effect in a synthetizing reactions with the construction as will be described hereinafter.

Now a typical synthetizing reactor equipped with a temperature control device for the catalyst layer in accordance with the invention will be described with reference to the accompanying drawings.

FIG. 1 is a vertical sectional view of a synthetizing reactor equipped with temperature control device for the catalyst layer according to the invention, as applied to arrangements for synthesis of ammonia;

FIG. 2 is a cross scetional view taken along the line $A_1$—$A_1$ of FIG. 1; and FIG. 3 is a diagram showing curves representing temperature changes of the catalyst layer in the reactor according to the invention.

In the figures, reference numeral 1 designates an outer cylinder of a synthetizer, and 2 an inner cylinder installed inside the outer cylinder 1 with a clearance 3 provided therebetween.

The top end of the outer cylinder 1 is hermetically sealed with a top cover 4. At a point close to the top end, the outer cylinder 1 is provided with an inlet port 5 for unreacted gas for use in cooling said outer cylinder 1, and the cylinder 1 is also provided with a main supply port 6 for unreacted gas at a point close to the bottom end.

A spacer ring 8 provided with a large number of minute holes 7 is fitted into the clearance 3 on the top end of the inner cylinder 2.

The inner cylinder 2 is divided into a reaction chamber 9 in the upper portion and a heat exchange chamber 10 in the lower portion. The top end of the inner cylinder 2 is partitioned by a heat-retaining plate 11, and the reaction chamber 9 and the heat exchange chamber 10 are partitioned by aeration chambers 13 and 14. The lower end of the heat exchange chamber 10 and the inside of the inner chamber 1 are partitioned by an aeration chamber 15 with an annular clearance 16 left therearound as a main passage for the unreacted gas.

The reaction chamber 9 is vertically divided into several concentric and cylindrical catalyst chambers 17, which are open at the top ends and communicate at the bottoms with the heat exchange chamber 10 by way of the aeration chamber 13. The catalyst chambers 17 are packed with a catalyst. Each annular clearance 18 between each pair of adjacent catalyst chambers 17 communicates at the top end with the catalyst chambers 17 and communicates at the bottom end with the heat exchange chamber 10 through the aeration chamber 14.

Each annular clearance 18 is provided with a multiplicity of cooling gas pipes 19.

The cooling gas pipes 19 are open into the annular clearances, some pipes in the region ($a$) above the intermediate portion of the reaction chamber 9, some in the region ($b$) in the intermediate portion of said chamber, and the other in the region (c) below the intermediate portion of said chamber. Penetrating through the heat-retaining plate 11, the cooling gas pipes 19 communicate with a delivery pipe 25 which extends out of the outer cylinder 1.

The heat exchange chamber 10 is provided with a plurality of staggered shelves 21 and a multiplicity of reaction gas delivery pipes 20 which directly communicate the aeration chambers 13 and 15 vertically through the heat exchange chamber 10. On the side walls between the lowermost staggered shelf 21 and the top end of the aeration chamber 16, a slit 22 is provided circumferentially for direct communication between the heat exchange chamber 10 and the inside of the outer cylinder 1.

A pipe for introducing unreacted gas heated outside into the outer cylinder 1 at the start of operation of the reactor, and also for introducing unreacted gas for cooling use normally in order to prevent the temperature rise of the portion above the catalyst layer, is generally indicated at 23. A discharge pipe for reaction gas is indicated at 24.

Next, the operation of the apparatus according to the invention will be explained.

Most of unreacted gas, i.e. material gas, is fed in through the main supply port 6. Part of unreacted gas is introduced through the inlet port 5 for cooling the outer cylinder 1, and flows down through the minute holes 7 of the spacer ring 8 into the clearance 3. The unreacted gas and the unreacted gas for cooling use are merged and led into the heat exchange chamber 10 in the inner cylinder 2 through the slit 22 provided on the side walls of said chamber.

The unreacted gas passed into the heat exchange chamber 10 passes among the plurality of staggered shelves 21 in zigzag fashion, and is gradually heated while exchanging the heat with the reaction gas flowing down through the reaction gas delivery pipes 20, until it is introduced into the reaction chamber 9 through the aeration chamber 14.

The unreacted gas introduced into the reaction chamber 9 then moves upward through the annular clearances 18 between adjacent pairs of catalyst chambers 17, while cooling said catalyst chambers 17.

Meanwhile, the unreacted gas for cooling use is led through the delivery pipe 25 and cooling gas pipes 19 into the annular clearances 18.

The unreacted gas for cooling use thus passed into the clearances 18 is mixed with the ascending unreacted gas thereby lowering the temperature, and also moves upward while cooling the catalyst chambers 17, and attains a temperature suitable for the synthetizing reaction, before it enters the catalyst chambers 17 from the top of the reaction chamber 9.

The gas reacted in the catalyst chamber 17 is fed from the lower end of the catalyst chamber 17 via the outlets 17b and aeration chamber 13 into the gas delivery tubes 20 defining the first gas flow path of the heat exchange chamber 10. These reacted gases undergo heat exchange with the unreacted gas in the second gas flow path of the heat exchange chamber 10 and are then discharged out of the outer cylinder 1 via aeration chamber 15 and reached gas discharge pipe 24″.

Next, the effects achievable by the apparatus of the invention will be described.

As the result of the communication of the annular space 18, which are cooling means for reaction chamber 9, with the pipes 19 through which further unreacted gas from the outside is passed the temperature of the cooling gas inside the annular spaces 18 can be controlled.

The cooling gas pipes 19 which are open in the annular clearances 18, some extend to the region (a), some to the region (b), and the other to the region (c).

Therefore, the flow rate of the cooling gas in the annular clearances 18 is lowest in the region below (c), higher in the region between (b) and (c), still higher in the region between (a) and (b), and highest in the region above (a). Thus, it is possible to prevent an excessive drop of the temperature in the vicinity of the outlet of the catalyst layer by slowing down the flow rate of the cooling gas in the lower portion of the reaction chamber 9 thereby limiting the heat transfer (cooling) effect upon said portion, and also to prevent excessive heating in the vicinity of the inlet of the catalyst layer by increasing the flow velocity of cooling gas in the upper portion of the reaction chamber 9 where much of reaction heat develops, thereby improving the heat transfer (cooling) effect.

Further, this construction is very useful in the prevention of any localized temperature rise of the catalyst layer.

In a catalytic reactor, there is a general tendency that, with the deterioration of the catalyst, the portion where the reaction takes place most rapidly, or the portion where the temperature rise is sharpest, shifts gradually toward the outlet of the catalyst layer. Such a difficulty can be adequately overcome by suitable use of the cooling gas pipes 19 which are the temperature control means for the catalyst layer.

An example of reaction temperature in the case where an apparatus according to the invention is employed is as follows.

The material gas used was a hydrogen-nitrogen mixture, with a mixing ratio of about 3:1, containing 2.0% of ammonia.

The temperature of the catalyst layer was between 450 and 520° C. and the pressure was 300 atm.

Unreacted gas mixture at a temperature of 180° C. was fed into the apparatus through the main supply inlet 6 and was heated by heat exchange with reacted gas having a temperature of from 380 to 480° C. passing through the reaction gas delivery tubes 20 of the heat exchange chamber 10. By the time the unreacted gas had reached the chamber 14, its temperature was 420° C. On entering the catalyst chamber 17 via inlets 17a, the unreacted gas temperature was 480° C.

The unreacted gas for cooling use which was introduced through the inlet port 5 for unreacted cooling gas, cooling gas pipes 19, and the unreacted cooling gas supply pipe 23, was at a temperature of 35° C. At the points leaving the cooling gas pipes 19, the temperature of unreacted gas dropped from about 490° to 420° C.

The temperature of reacted gas at the outlets of catalyst chambers 17 was 480° C. and the gas temperature inside the discharge pipe 24 was 380° C. with an ammonia content ranging from 18 to 20%.

FIG. 3 shows curves which represent the relations between the length of catalyst layer (axis of coordinates) and gas temperature (axis of abscissas) obtained by the apparatus of the invention.

In the figure, the points (A), (B) and (C) correspond to the regions (a), (b) and (c) in FIG. 1. In other words, they indicate the temperatures of a mixture of the unreacted gas ascending through the heat exchange chamber 10 with the unreacted gas for cooling use (that is, of the catalyst layer).

We claim:

1. An apparatus for effecting a catalysed gaseous reaction, which comprises a reaction chamber and a heat exchanger, said reaction chamber comprising a plurality of spaced catalyst chambers each having an inlet for introduction of unreacted gas and an outlet for discharge of reacted gas and said heat exchanger having a means defining a first gas flow path in communication with said outlets and a means defining a second gas flow path, said first gas flow path being separate from but in thermal contact with said second gas flow path, the space between said catalyst chambers being such as to afford a passage for unreacted gas from said second gas flow path to the inlets of said catalyst chambers and having a plurality of pipes disposed therein, each pipe having an outlet in communication with the space whereby, when the apparatus is in use, further unreacted gas can be passed into said space via said pipes and admixed with the unreacted gas in said space, the arrangement being such that, in use, unreacted gas flows through said space in a direction opposite to the direction of flow of gas through the catalyst chambers.

2. An apparatus as claimed in claim 1, wherein said catalyst chambers are substantially circular in cross-section and are arranged substantially concentrically with respect to one another whereby the space between adjacent catalyst chambers is substantially annular.

3. An apparatus as claimed in claim 1, wherein the reaction chamber and the heat exchanger are disposed in an outer chamber, the arrangement being such that, in use of the apparatus, additional unreacted gas can be passed between the inner wall of the outer chamber and the outer wall of the reaction chamber and thence into the heat exchanger.

4. An apparatus as claimed in claim 1, wherein the means defining said first gas flow path comprises a plurality of tubes and said means defining said second gas flow path comprises a chamber in which the tubes are disposed, said chamber being provided with baffles to facilitate heat exchange between unreacted gas in said chamber and reacted gas in the tubes in use of the apparatus.

5. An apparatus as claimed in claim 1, wherein the pipes in the space are so arranged that the outlets of some of the pipes are disposed at a greater distance from the inlets of said catalyst chambers than are the outlets of other of the pipes.

6. An apparatus as claimed in claim 1, wherein a further pipe is provided in the reaction chamber for introduction of still further unreacted gas into the apparatus, sad further pipe being in communication with the inlets of said catalyst chamber.

References Cited
UNITED STATES PATENTS

| | | | |
|---|---|---|---|
| 1,850,398 | 3/1932 | Jaeger | 23—288 |
| 2,512,586 | 6/1950 | Stengel | 23—288 |
| 2,517,525 | 8/1950 | Cummings | 23—288 |
| 3,127,247 | 3/1964 | Davis | 23—288 |

FOREIGN PATENTS

| | | |
|---|---|---|
| 248,999 | 3/1926 | Great Britain. |
| 993,511 | 7/1951 | France. |
| 671,573 | 5/1952 | Great Britain. |

JOSEPH SCOVRONEK, Primary Examiner